United States Patent [19]

Heubert

[11] Patent Number: 5,344,686
[45] Date of Patent: Sep. 6, 1994

[54] TENSION STRAINED FIBER STRUCTURE COMPONENT

[75] Inventor: Horst Heubert, Unterhaching, Fed. Rep. of Germany

[73] Assignee: MTU Motoren- Und Turbinen-Union Muenchen GmbH, Fed. Rep. of Germany

[21] Appl. No.: 861,808

[22] PCT Filed: Dec. 20, 1990

[86] PCT No.: PCT/DE90/00979
§ 371 Date: Aug. 18, 1992
§ 102(e) Date: Aug. 18, 1992

[87] PCT Pub. No.: WO91/08893
PCT Pub. Date: Jun. 27, 1991

[30] Foreign Application Priority Data

Dec. 20, 1989 [DE] Fed. Rep. of Germany ....... 3942024

[51] Int. Cl.$^5$ ................................. B32B 1/04
[52] U.S. Cl. .................................. 428/75; 416/229 A; 416/229 R; 416/230; 428/114; 428/192; 428/285; 428/294; 428/902
[58] Field of Search ............... 428/114, 192, 285, 294, 428/75, 902; 416/229 R, 230 A, 229 A

[56] References Cited

U.S. PATENT DOCUMENTS

| | | | |
|---|---|---|---|
| 4,673,606 | 6/1987 | Unden et al. | 428/138 |
| 4,935,291 | 6/1990 | Gunnick | 428/294 |
| 5,227,216 | 7/1993 | Pettit | 428/294 |

Primary Examiner—James J. Bell
Attorney, Agent, or Firm—Evenson, McKeown, Edwards & Lenahan

[57] ABSTRACT

A tension strained fiber structure component comprises a plurality of mutually connected structural elements which each consists of a fiber strand plate aligned in the tension direction and of a pressure plate extending at an acute angle with respect to the tension direction, which are both connected with one another. As a result, a favorable introduction of the tension forces into a separate supporting component can be achieved.

21 Claims, 8 Drawing Sheets

TENSION STRAINED FIBER STRUCTURE COMPONENT

This invention relates to a tension strained fiber structure component which, at least on one end, has supporting surfaces deviating from the direction of the tension for the form-fitting support on a separate supporting component.

Fiber structure components are capable of processing very high tensile strains with breakage and are therefore, and because of their low weight, suitable for transmitting such tensile loads. One problem in this case, however, is the introduction of force from the fiber structure component into a supporting element absorbing the tensile forces because it is necessary that only very low shearing strains occur during the introduction of force or that they must be avoided altogether because the shearing strength of composite fiber materials is considerably below the tensile strength.

An ideal introduction of force is obtained when the fiber structure component is constructed of loops and a cross pin, which is mounted between the loops and is supported in the supporting housing, transmits the forces. Only slight shearing or transverse forces or shearing strain occur in the case of this known solution. However, it is a disadvantage of this solution that, for achieving a uniform straining of all fiber strands, a relatively large inside loop diameter is required which results in a large overall volume in the fastening area.

Based on the above, it is an object of the present invention to provide a tension strained fiber structure component which can be form-fittingly supported at least on one end and which, in the fastening area, requires only little additional space and, as a result of which, at the same time, a distribution of forces and tension is achieved that is as advantageous as possible for the fibers.

According to the invention, this and other objects are achieved by a tension strained fiber structure component having supporting surfaces which deviate from a tension direction for form-fitting support on a separate supporting component, constructed of a plurality of fiber strand plates which are aligned in parallel in the tension direction and between which pressure plates are embedded which have sections projection beyond the cross-section of the fiber strand plates which absorbs tensile strain, and which form supporting surfaces.

The basic idea of the invention consists of the fact that the tension strained component is divided into two types of differently constructed elements. The pressure plates are used for absorbing pressure forces and shearing forces and are in form closure with the supporting component which surrounds them. The plate-shaped fiber strands, on the other hand, are used for absorbing tensile forces. The connection of the pressure plates and the fiber strand plates takes place by means of embedding so that a uniform bonding is created. By placing in a row next to one another a plurality of thin pressure plates and fiber strand plates, the possibility is provided of reducing the occurring shearing strains to such an extent that the tensile strength of the fiber can be utilized completely. The number of the used elements (that is, one pressure plate and one fiber strand plate respectively) depends on the given dimensions of the component and the selected strengths of the plate thickness.

The most important advantages of the invention are that the force transmission between the tension strained fiber strand plates and the pressure-loaded pressure plates takes place over a large surface, whereby the occurring shearing strains are kept low and do not reduce stability. By placing a large number of elements of the same type, which are connected with one another, next to one another in a row, the width of the fiber structure element can be varied easily, whereby adaptations can be carried out to the occurring strains. Finally, little space is required in order to support the component on a separate supporting component because the pressure plates must project only slightly laterally beyond the fiber strand plates.

Preferably, the pressure plates are made of a homogenous material which transmits high shearing forces, such as a metal, metal monocrystal fibers or ceramics.

An advantageous development of the invention is embedding the pressure plates in a form-fitting manner in correspondingly interrupted fiber strand plates or in intermediate matrix layers. Such an embedding has the advantage that the pressure plates must not be flatly connected with the fiber strand plates in a frictional manner because, by way of the narrow end faces of the pressure plates, the forces are transmitted to the intermediate matrix layers or interrupted fiber strand plates and are introduced into the continuous fiber strand plates by the quasihomogenous connection of these interrupted fiber strand plates or intermediate matrix layers with the continuous fiber strand plates. In addition, a connection may be provided between the fiber strand plates and the surfaces of the pressure plates by means of gluing or by way of the common resin matrix.

Another advantageous development of the invention is the fact that several rows of pressure plates are provided behind one another at a distance in the direction of the tension. By means of this multi-row arrangement of pressure plates, an occurring tensile strain is uniformly distributed so that a component of this type of a construction can be stressed by still higher tensile forces.

Carbon fibers, boron fibers, fiber glass, aramide fibers or mixtures thereof are preferably used as the material for the fiber strand plates. Finished fiber strand plates preferably have a thickness of between 5/100–5/10 mm, in which case the most advantageous thickness was found to be 1/10 mm because fiber strand plates of this thickness are commercially available.

An advantageous further development of the invention provides that the fiber structure component has a rotationally symmetrical construction. This means that the structural components are cylindrical-sector-shaped it, their cross-section, and a number of structural components together result in a complete rotationally symmetrical formation. Advantageously, the pressure plates of adjacent structural elements, for forming a thread, may have different dimensions in the direction of the tension. The simplest method is constructing a rotationally symmetrical components and subsequently machining a thread into the pressure plates.

A method for manufacturing a component according to the invention is characterized in that, alternately, fiber strand plates oriented in the tension direction and pressure plates oriented at an acute angle in this respect are first placed on top of one another and are then treated with resin. After a number of or all structural elements have been placed on top of one another, the component is subjected for a time under pressure to an increased temperature which is suitable for hardening the resin. In the case of conventional resins, the hardening temperature is in the range of approximately from 150° C.–200° C.; the pressure is in the range of approximately from 10–50 bar; and the time duration of the hardening process amounts to approximately 1 to 4 hours.

Preferably, the fiber structure component is finished in that first the fiber strand plates and the pressure plates are manufactured with an overmeasure, and the final contour is obtained by milling and turning the hardened blank to the final size.

Other objects, advantages and novel features of the present invention will become apparent from the following detailed description of the invention when considered in conjunction with the accompanying drawings.

DETAILED DESCRIPTION OF THE DRAWINGS

Figure 1A:
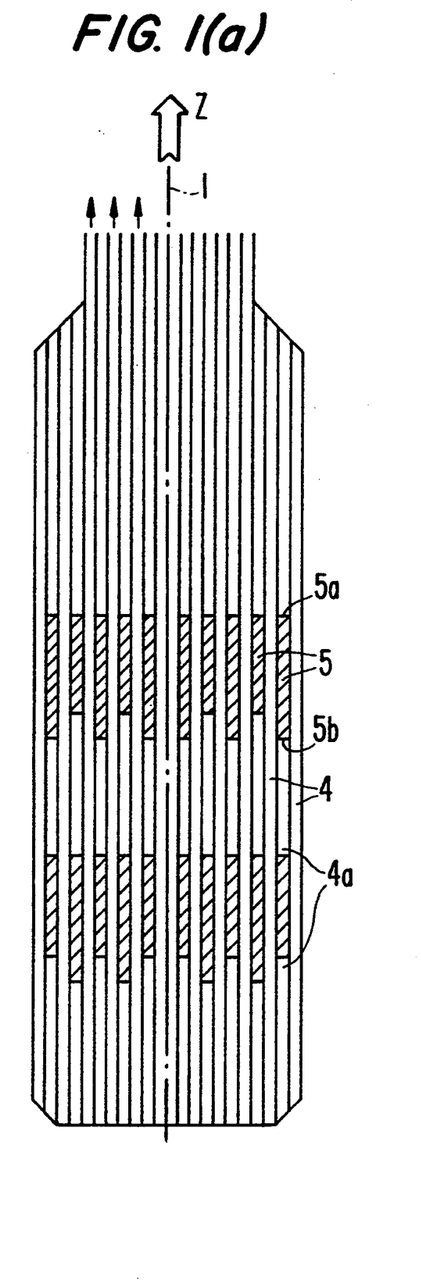
FIG. 1 are two orthogonal longitudinal sectional views of a basic embodiment of a fiber structure component according to the invention.
Figure 1B:
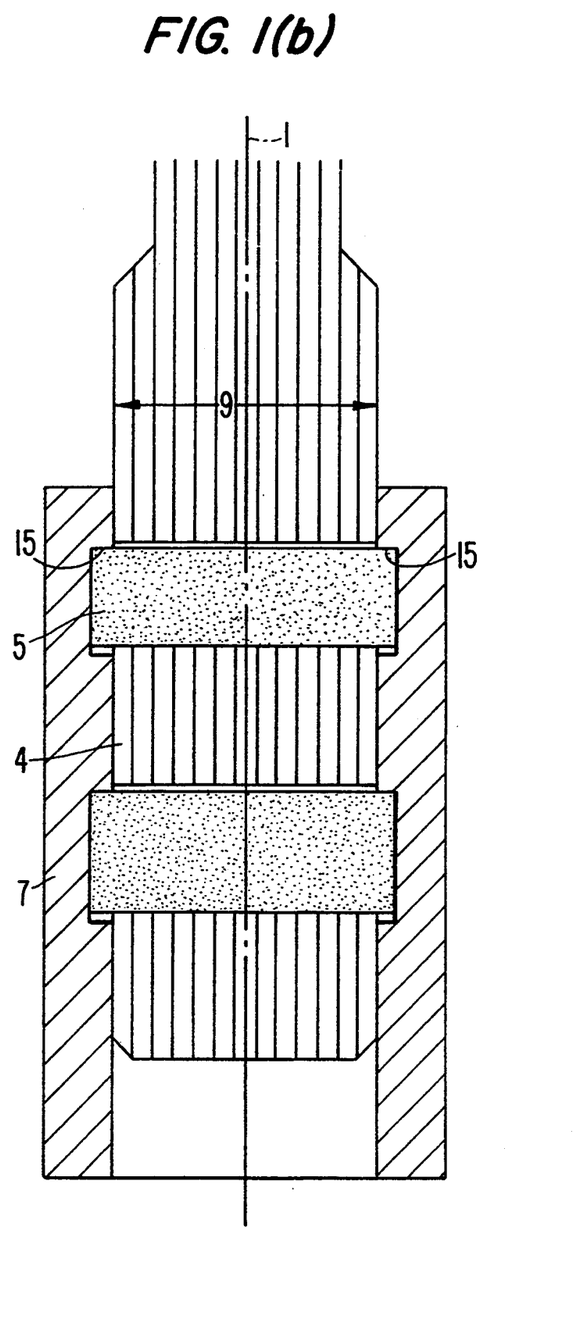

The basic embodiment of a tension strained fiber structure component according to the invention illustrated in FIG. 1 comprises a plurality of fiber strand plates 4 which are aligned in parallel in the tension direction Z and between which pressure plates 5 are embedded. As indicated in the sectional view according to FIG. 1b, the pressure plates 5 project with their end sections beyond the cross-section q of the fiber strand plates. The sections of the pressure plates 5 which project beyond the cross-section q form the supporting surfaces 15 by means of which the fiber structure component is supported on the separate supporting component 7 in a form-fitting manner. The component illustrated in FIG. 1 must be constructed to be rotationally symmetrical with respect to the center axis 1 so that correspondingly the supporting component 7 is constructed as a hollow cylinder with ring-shaped recesses for the protruding sections of the pressure plates 5. The construction of such a fiber structure component according to the invention is, however, not tied to the exterior—perhaps rotationally symmetrical—shape so that, in the same manner, the component may be designed with a polygonal cross-section. As indicated in the sectional view according to FIG. 1a, the pressure plates 5 are form-fittingly embedded in correspondingly interrupted fiber strand plates 4a. A transmission of force between the pressure plates 5 and the fiber strand plates 4 preferably takes place on the narrow end faces 5a, 5b of the pressure plates. The introduction of force into the fiber strand plates 4 takes place by way of the interrupted fiber strands 4a which, together with the fiber strand plates 4, preferably form an integral fiber structure. In this manner, a shearing-force-transmitting connection between the surfaces of the pressure plates 5 and the fiber strand plates 4 is not required. Nevertheless, if an extremely high stability under load is required, such a connection may be provided by gluing. The pressure plates 5 may have a very thin construction so that the laminar structure of the whole component is obtained which is illustrated in FIG. 1a. In order to ensure a transmission of force between the pressure plates and the fiber strand plates 4 that is as constant as possible, the pressure plates 5 are alternately of a different length. In addition, they may be arranged to be offset in the tension direction Z. However, in this case, the corresponding supporting surfaces must then be adapted to the supporting component 7.

Figure 2:
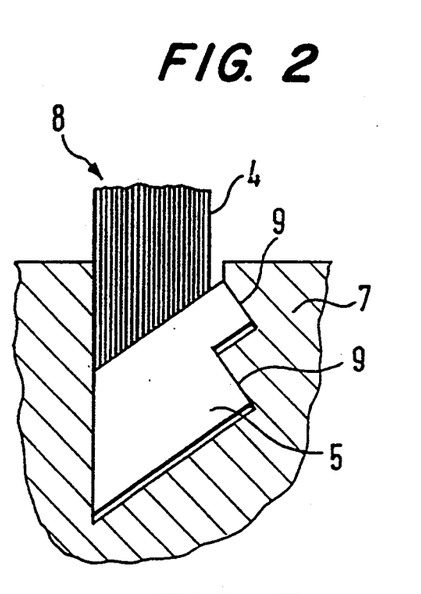
FIG. 2 is a view of a fiber structure component provided with sloped pressure plates.

In the case of the embodiment shown in FIG. 2, an angularly arranged pressure plate 5, which is supported on a supporting component 7, is mounted on the fiber strand plate 4. These two components each form a structural element 8, a plurality of such structural elements 8 arranged behind one another forming the tension strained component. In the illustrated embodiment, the pressure plate 5 extends over the total width of the fiber strand plate 4 and transmits the tension forces on the end face 9. In this case, the pressure plate 5, which is preferably made of metal, has a stepped shoulder for forming the two end faces 9.

Figure 3:
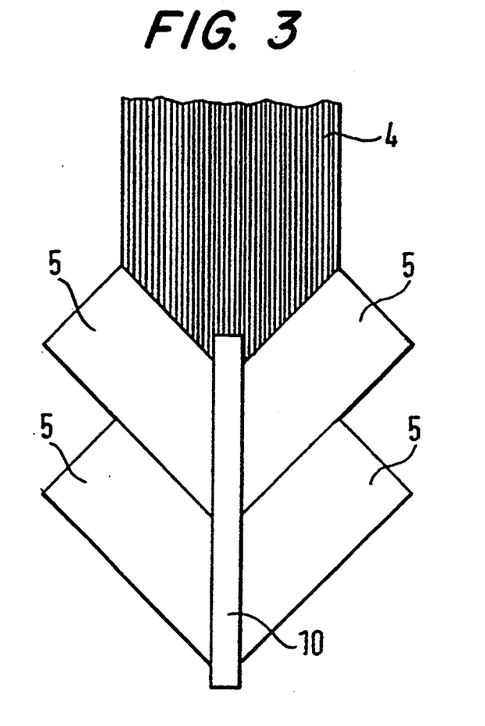
FIG. 3 is a view of another embodiment with sloped pressure plates.

The embodiment according to FIG. 3 is similar to that of FIG. 2, in which case, however, two respective pressure plates 5 are provided which are sloped with respect to one another, and a supporting plate 10 is embedded at the location of the joints in the area of the longitudinal center axis of the fiber strand plates 4, this supporting plate 10 permitting an improved symmetrical support of the pressure forces.

Figure 4:
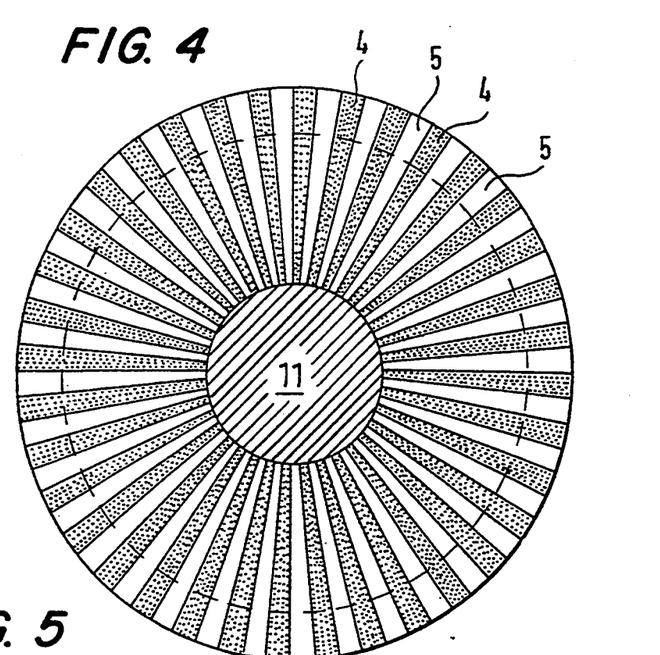
FIG. 4 is a cross-sectional view of a rotationally symmetrical component.

FIG. 4 is a cross-sectional view of a rotationally symmetrical tension strained component, in the case of which the fiber strand plates 4 and the pressure plates 5 are circular-sector-shaped in their cross-section, and a number of structural elements, each comprising a fiber strand plate 4 and one or several pressure plates disposed above one another, together, form a full circle and thus form the rotationally symmetrical component. In the center, a supporting cylinder 11 is arranged which is made of a material, such as metal or ceramics, which can be stressed by pressure.

Figure 5:
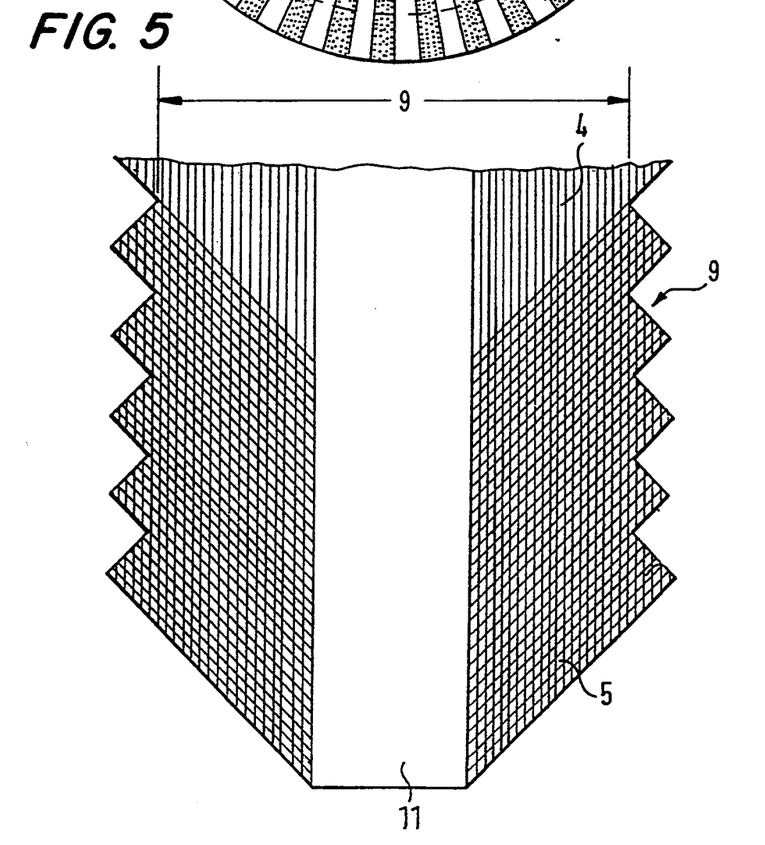
FIG. 5 is a longitudinal sectional view of the embodiment according to FIG. 4.

FIG. 5 shows a partial longitudinal sectional view of the component according to FIG. 4 which indicates that the fiber strand plates 4 and the pressure plates 5 have the same external contour. By means of turning or milling, a tooth structure was machined into this cylindrical component. This tooth structure may have a thread-type design in order to be able to thus produce a stable fiber structure thread of a tension strained component. Preferably, the pressure plates 5 are made of metals or other materials that can be stressed by pressure. However, if extremely weight-saving components are to be created, a fiber material may also be used for the pressure plates. The fiber orientation must then preferably be selected such that it extends perpendicularly to the end faces 9, as indicated in FIG. 5.

Figure 6A:
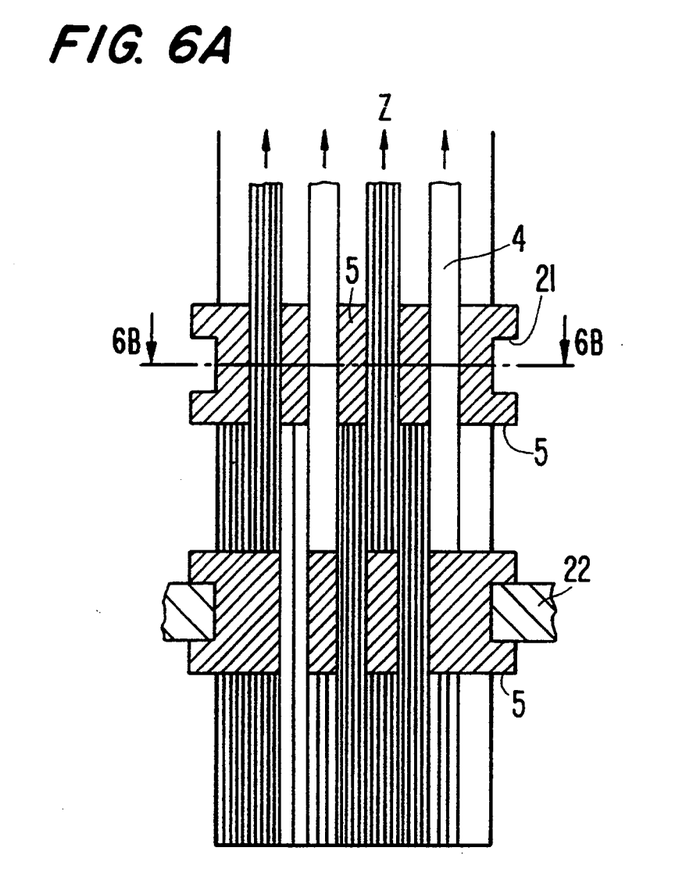
FIG. 6 is a longitudinal and cross-sectional view of a component according to the invention, in the case of which the supporting surfaces are formed by surrounding ring grooves.
Figure 6B:
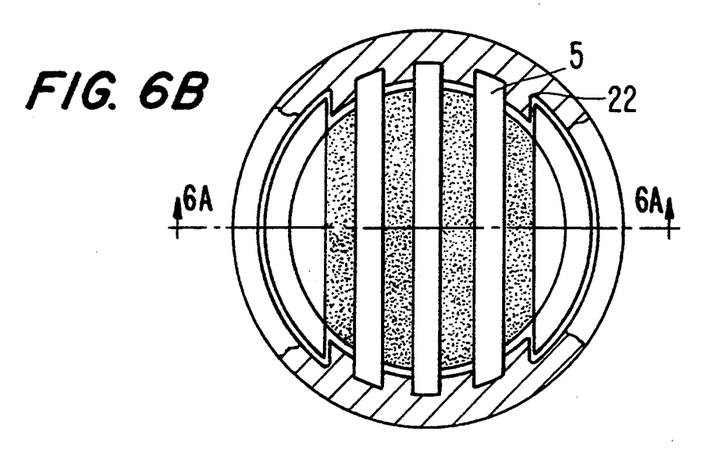

The tension strained fiber structure component, which is shown in a longitudinal and cross-sectional view in FIG. 6, differs from the basic embodiment according to FIG. 1 by the fact that the pressure plates are provided with a groove at their sections projecting beyond the fiber strand plates so that an outwardly surrounding ring groove 21 is obtained in the case of a rotationally symmetrical component. This surrounding ring groove 21 is used as a form-fitting support on a correspondingly ring-shaped supporting component in the form of a metal support 22. As indicated in the longitudinal-sectional view according to FIG. 6, it may be desirable to construct the pressure plates 5,' which are arranged in the edge zones in the transverse direction with respect to the plane of the fiber strand plates 5 on both sides, with a larger thickness than the pressure plates 5 arranged in the central area of the component.

Figure 7:
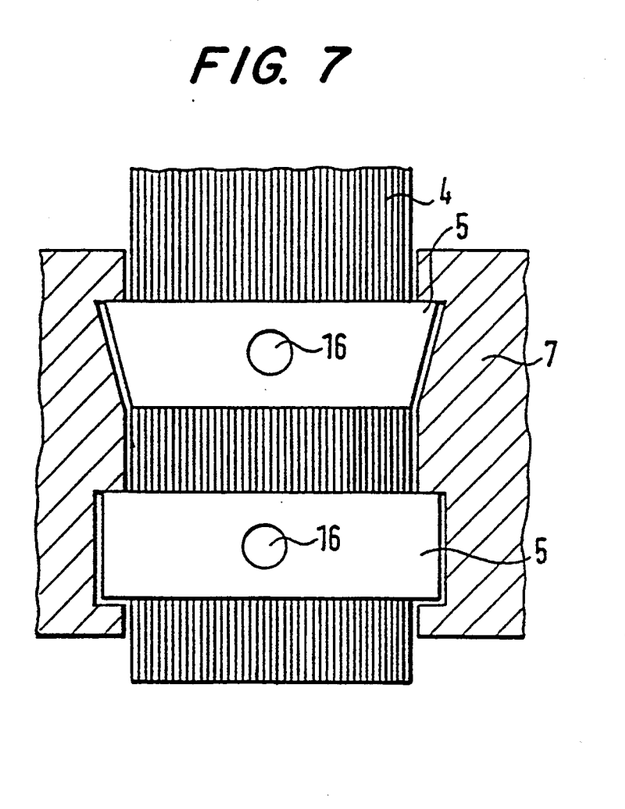
FIG. 7 is a sectional view of a tension component.

FIG. 7 shows another embodiment of the invention in which two rows of pressure plates 5 are aligned above one another transversely to the course of the fiber strand plates 4. The upper pressure plate has chamfered flanks, while the lower pressure plate 5 has a rectangular cross-section. These two different embodiments are shown together only for the purpose of representation, while in practice either one or the other embodiment will be selected. The pressure plates 5 have bores 16 for the positioning. This positioning takes place in that the bores are filled by resin material of the fiber strand plates 4 arranged on both sides of the pressure plates 5 and thus prevent a sliding of the pressure plates 5.

Figure 8:
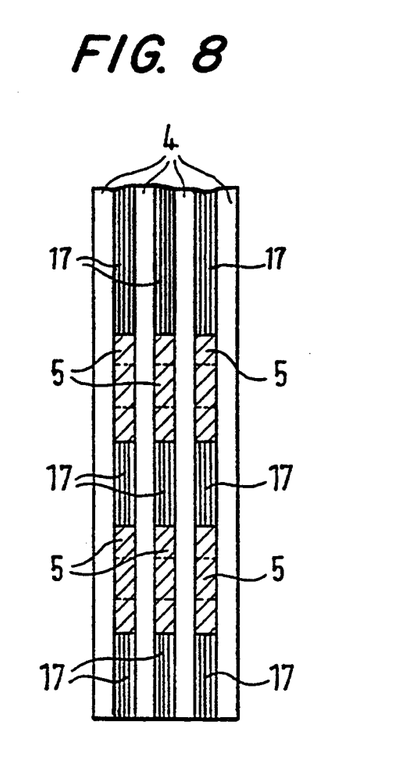
FIG. 8 is a cross-sectional view of the embodiment according to FIG. 7.

The embodiment according to FIG. 7 is shown in its cross-section in FIG. 8, in which case four fiber strand plates 4 exist which are arranged next to one another. In-between, the two rows of three pressure plates 5 respectively are provided in which case these are supported on intermediate layers 17. These intermediate layers 17 may be made of a pure matrix material or also of a fiber material like the fiber strand plates 4 and are connected with the adjacent fiber strand plates by means of the common resin matrix. The interrupted lines indicate the bores 16 (compare FIG. 7) in the pressure plates 5 which are filled with resin or laminate and which permit a pin-type form closure which contributes to the transmission of the load.

Figure 9:
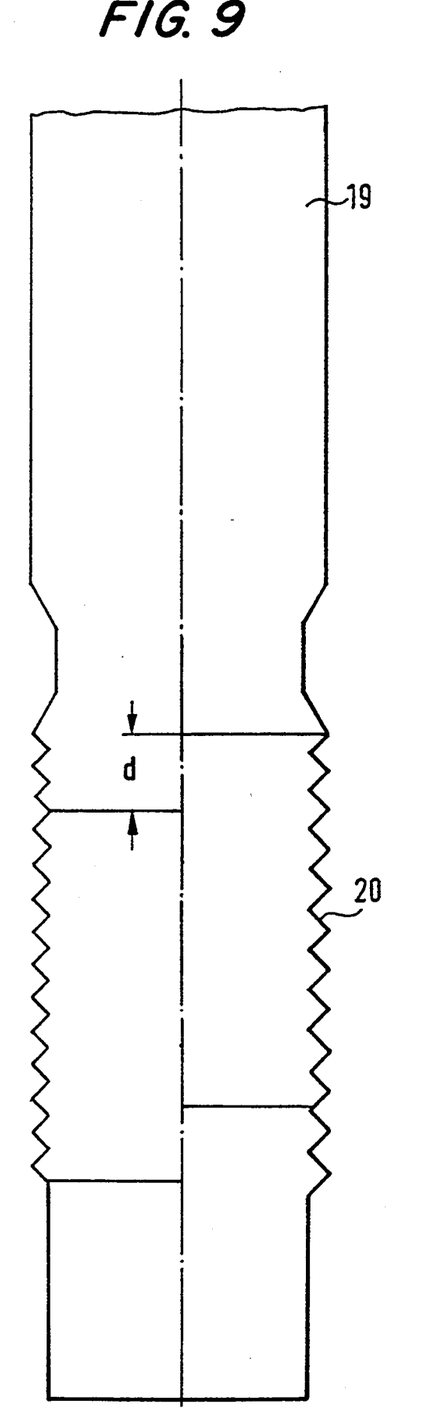
FIG. 9 is a view of another tension component according to the invention constructed as a threaded pin.
Figure 10:
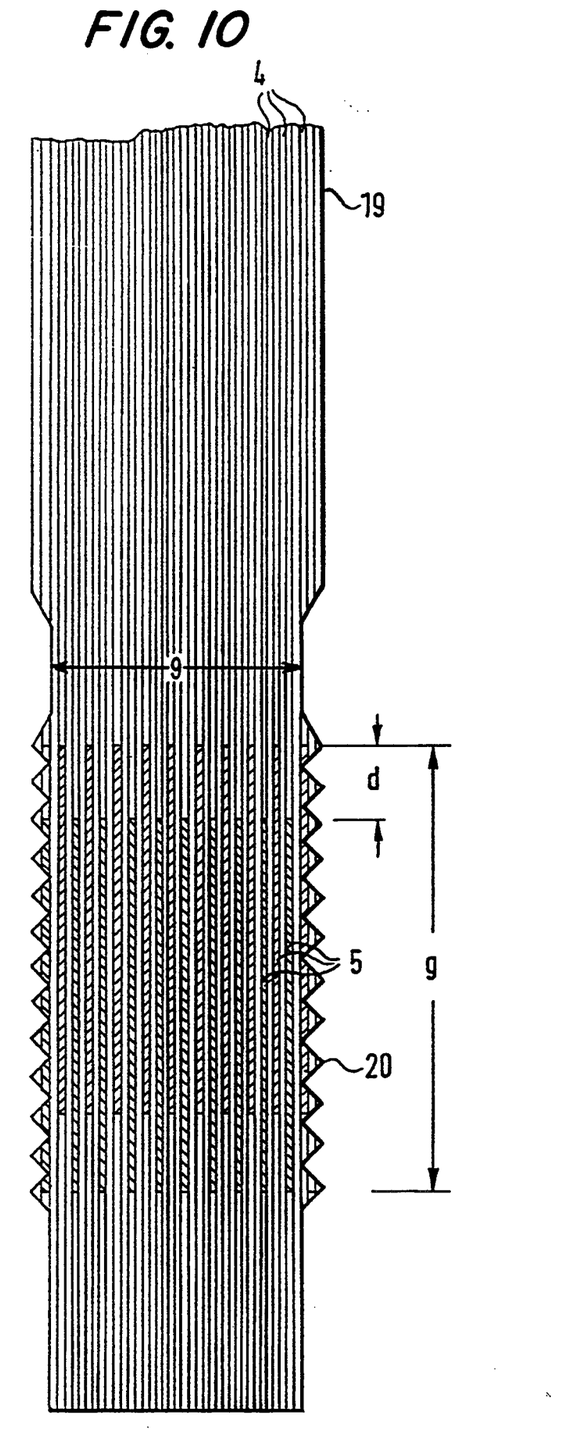
FIG. 10 is a sectional view of the component according to FIG. 9.

Another embodiment of the invention is illustrated in FIGS. 9 and 10 in two views.

In FIGS. 9 and 10, a rotationally symmetrical component 19 is shown which, in turn, is constructed of a plurality of lamella-type fiber strand plates 4 and pressure plates 5. FIG. 9 has two sectional views of adjacent pressure plates 5 according to FIG. 10 which are alternately offset in the longitudinal direction of the component 19 by the distance d in order to achieve a more balanced absorption of the load. The component 19 constructed of plane plates 4 is rotationally symmetrically turned, a thread being cut in in the area g. This thread 20 forms the supporting surface (flanks of the thread), in which case, between the preferably metallic pressure plates 5 in the area of the supporting threads, interrupted fiber strand plates or other filler material may be provided, as indicated in the sectional view according to FIG. 10. An improved absorption of the supporting forces can be achieved by the fact that the pressure plates in the area of the edge zones, which extend transversely with respect to the plane of the fiber strand plates, are constructed with a larger thickness, as indicated in FIG. 6 by the reference number 5'.

Figures 11, 12:
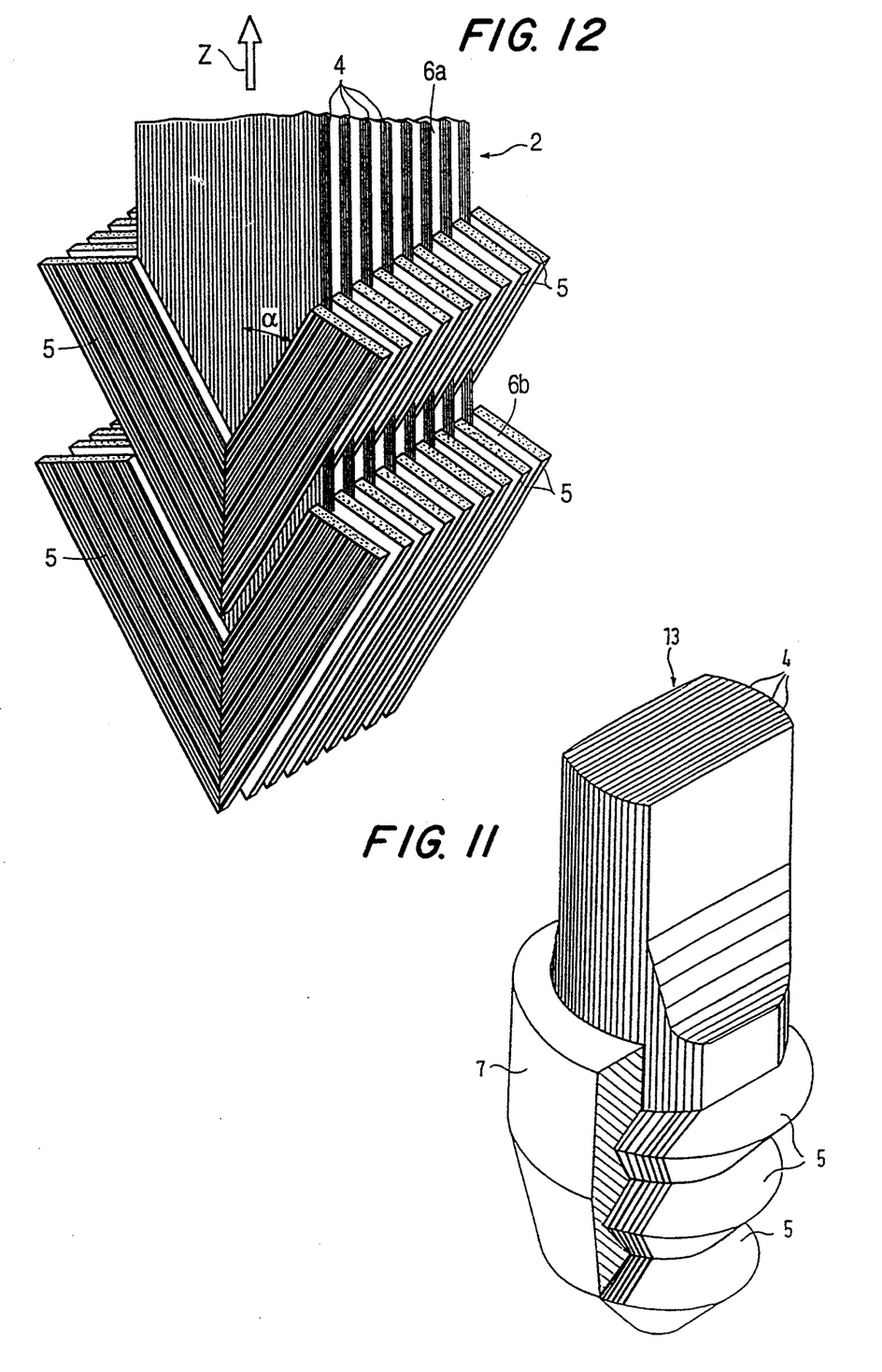
FIG. 11 is a schematic diagonal view of a tension component.
FIG. 12 is a diagonal view of a tension component, in the case of which the pressure plates also consist of a fiber structure material.

FIG. 11 is a schematic partially sectional diagonal view of an embodiment similar to the one illustrated in FIG. 5. A tension rod 13 constructed of a number of fiber strand plates 4 is held in a supporting component 7 by the fact that three rows of pressure plates 5, which are disposed above one another, are connected with the fiber strand plates 4. The supporting component 7 is arranged stationarily and absorbs the forces applied to the tension rod 13. In this case, the tension rod 13 is rotationally symmetrically turned inside the supporting component 7 so that an approximately rotationally symmetrical christmas tree profile was achieved.

The tension strained component illustrated in FIG. 12 comprises essentially a fiber structure shaft 2 which is stressed by tension forces in the direction marked by the Z, and a supporting housing, which is not shown, is mounted on the devices for supporting the tension forces. The fiber structure shaft comprises a number of fiber strand plates 4 which are aligned at a distance in parallel, while the supporting devices are constructed as pressure plates 5 which are embedded into the spaces between the adjacent fiber strand plates 4 for the formation of a sandwich-type structure. In this case, the overall construction of the component may be understood to be such that one fiber strand plate 4 respectively forms a common structural element with a pressure plate 5 mounted on it, and the overall component is constructed of a number of these structural elements.

In this case, the pressure plates 5 are also made of a fiber structure material and are aligned at an acute angle a with respect to the fiber direction of the fiber strand plates 4 and are connected with the two fiber strand plates 4 provided on both sides by means of gluing or by means of a common resin matrix. In the illustrated embodiment, the two pressure plates 5 together form a V-shaped supporting structure, and two such supporting structures are mounted above one another on the fiber structure shaft. The spaces 6a between the fiber strand plates or the spaces 6b between the pressure plates 5 may be filled with a fiber material or another material.

Figure 13:
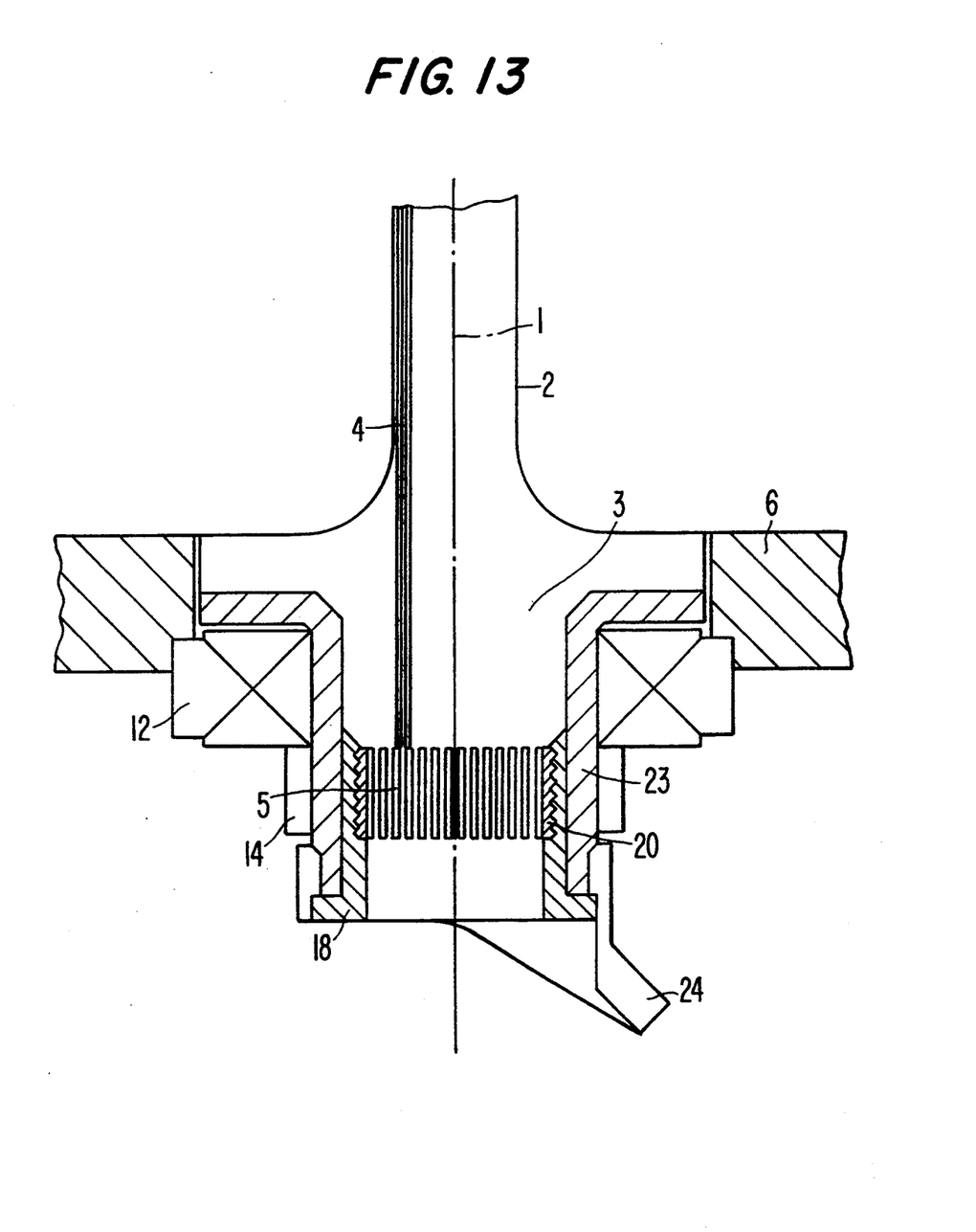
FIG. 13 is a sectional view of the base area of a turbo-blade constructed according to the invention.

FIG. 13 is a sectional view of the base area of a moving blade for a turborotor which is constructed as a fiber structure component according to the invention in order to be able to introduce the high centrifugal forces occurring during the operation into the rotor body. This is an adjustable axial blade device; that is, an axial blade device that can be swivelled about its longitudinal axis 1, with a blade 2 and a blade base area 3. The blade device is supported in the rotor 2 by means of an axial bearing 12. The blade body, as a whole, is constructed of fiber strand plates 4, some of which are indicated in the Figure. In the base area 3, according to the invention, a plurality of pressure plates 5 are arranged in the above-described manner in the fashion of lamellae between the fiber strand plates 4. At the circumferences of the cylindrical blade base, the metallic pressure plates 5 form a thread 20 by means of which the tensile forces from the centrifugal stress are transmitted to a threaded bush 18. The threaded bush 18 is supported on a stereo cylinder 23 which surrounds the blade base constructed as a fiber structure and which, in turn, by means of a threaded ring 14, is supported on the pivot bearing 12.

An adjusting lever 24 is non-rotatably connected with the stereo cylinder 23 so that, by means of the actuating of this adjusting lever 24, a swivelling of the blade device can take place with respect to the housing 6. The threaded bush 18 therefore carries out the function of the separate supporting component. In detail, the construction and arrangement of the pressure plates 5 may take place as indicated in FIGS. 1 to 11. In particular, two rows of pressure plates 5 may be provided at an axial distance.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A tension strained fiber structure component having supporting surfaces which deviate from a tension direction for form-fitting supporting a separate supporting component, constructed of a plurality of fiber strand plates which are aligned in parallel in the tension direction and between which pressure plates are arranged which have sections projecting beyond the cross section of the fiber strand plates which absorbs tensile strain, and which form supporting surfaces, wherein several rows of pressure plates are form-fittingly embedded in the tension direction at a distance behind on another in correspondingly interrupted fiber strand plates or in intermediate matrix layers.

2. A tension strained fiber structure component having supporting surfaces which deviate from a tension direction for form-fitting support on a separate supporting component, constructed of a plurality of fiber strand plates which are aligned in parallel in the tension direction and between which pressure plates are arranged which have sections projecting beyond the cross section of the fiber strand plates which absorbs tensile strain, and which form supporting surfaces, wherein in that the pressure plates are formfittingly embedded in correspondingly interrupted fiber strand plates or in intermediate matrix layers, and the component has a rotationally symmetrical construction, a thread or a ring groove being cut in at the circumference which grips the pressure plates and the fiber strand plates.

3. A tension strained fiber structure component having supporting surfaces which deviate from a tension direction for form-fitting support on a separate supporting component, constructed of a plurality of fiber strand plates which are aligned in parallel in the tension direction and between which pressure plates are arranged which have sections projecting beyond the cross section of the fiber strand plates which absorbs tensile strain, and which form supporting surfaces, wherein the pressure plates are formfittingly embedded in correspondingly interrupted fiber strand plates or in intermediate matrix layers, the pressure plates being aligned at an acute angle with respect to the tension direction.

4. A tensioned strained fiber structure component according to claim 1, wherein the pressure plates are made of a homogenous material, such as metal, metal monocrystal fibers or ceramics, which transmits high shearing forces.

5. A tensioned strained fiber structure component according to claim 2, wherein the pressure plates are made of a homogeneous material, such as metal, metal monocrystal fibers or ceramics, which transmits high shearing forces.

6. A tensioned strained fiber structure component according to claim 3, wherein the pressure plates are made of a homogeneous material, such as metal, metal monocrystal fibers or ceramics, which transmits high shearing forces.

7. A tension strained fiber structure component according to claim 1, wherein the pressure plates, in addition to the form closure, are non-positively connected with the fiber strand plates.

8. A tension strained fiber structure component according to claim 2, wherein the pressure plates, in addition to the form closure, are non-positively connected with the fiber strand plates.

9. A tension strained fiber structure component according to claim 3, wherein the pressure plates, in addition to the form closure, are non-positively connected with the fiber strand plates.

10. A tension strained fiber structure component according to claim 1, wherein the fiber strand plates are made of carbon fiber, boron fiber, fiber glass, aramide fiber or mixtures thereof and are disposed in a matrix of epoxy resin or thermoresin.

11. A tension strained fiber structure component according to claim 2, wherein the fiber strand plates are made of carbon fiber, boron fiber, fiber glass, aramide fiber or mixtures thereof and are disposed in a matrix of epoxy resin or thermoresin.

12. A tension strained fiber structure component according to claim 3, wherein the fiber strand plates are made of carbon fiber, boron fiber, fiber glass, aramide fiber or mixtures thereof and are disposed in a matrix of epoxy resin or thermoresin.

13. A tension strained fiber structure component according to claim 1, wherein the pressure plates are made of a fiber structure material with a fiber orientation that differs with respect to the tension direction.

14. A tension strained fiber structure component according to claim 2, wherein the pressure plates are made of a fiber structure material with a fiber orientation that differs with respect to the tension direction.

15. A tension strained fiber structure component according to claim 3, wherein the pressure plates are made of a fiber structure material with a fiber orientation that differs with respect to the tension direction.

16. A tension strained fiber structure component according to claim 2, wherein edge zones in the direction transversely with respect to a plane of the fiber strand plates, on both sides, are formed by pressure plates of a larger thickness.

17. A tension strained fiber structure component according to claim 3, wherein a supporting plate is arranged in the center of the component on which the pressure plates are supported with their interior-side ends.

18. A moving blade for a turborotor having a blade base constructed for the support of the centrifugal forces, constructed as a fiber structure material having supporting surfaces which deviate from a tension direction for the form-fitting support on a separate supporting component, constructed of a plurality of fiber strand plates, which are aligned in parallel in the tension direction and between which pressure plates are embedded which have sections projecting beyond the cross-section of the fiber strand plates which absorbs tensile strain, and which form supporting surfaces, wherein several rows of pressure plates are form-fittingly embedded in the tension direction at a distance behind one another in correspondingly interrupted fiber strand plates or in intermediate matrix layers.

19. A tension strained fiber structure component according to claim 1, wherein alternately fiber strand plates, oriented in the tension direction, and pressure plates, arranged to be deviating from the tension direction, are placed upon one another, are treated with resin and are joined under pressure at a hardening temperature.

20. A tension strained fiber structure component according to claim 2, wherein alternately fiber strand plates, oriented in the tension direction, and pressure plates, arranged to be deviating from the tension direction, are placed upon one another, are treated with resin and are joined under pressure at a hardening temperature.

21. A tension strained fiber structure component according to claim 3, wherein alternately fiber strand plates, oriented in the tension direction, and pressure plates, arranged to be deviating from the tension direction, are placed upon one another, are treated with resin and are joined under pressure at a hardening temperature.

* * * * *

UNITED STATES PATENT AND TRADEMARK OFFICE
CERTIFICATE OF CORRECTION

PATENT NO. : 5,344,686
DATED : September 6, 1994
INVENTOR(S) : Horst NEUBERT

It is certified that error appears in the above-indentified patent and that said Letters Patent is hereby corrected as shown below:

On the title page, under item [19] and item [75], change "Heubert" to --Neubert--.

Signed and Sealed this

Seventeenth Day of January, 1995

Attest:

BRUCE LEHMAN

*Attesting Officer*  *Commissioner of Patents and Trademarks*